May 7, 1963 J. F. BECKERICH ETAL 3,089,099
GATED I.F. AMPLIFIER BEAM TYPE
Filed July 15, 1960
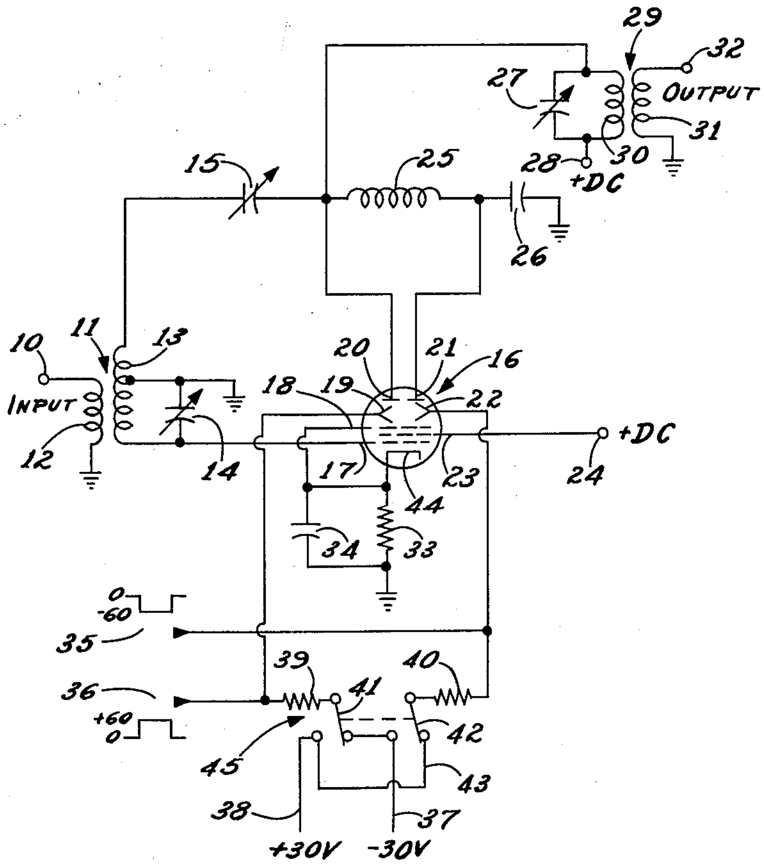
INVENTORS
JOHN F. BECKERICH
JULIUS L. SMITH JR.
BY
Moody & Anderson
AGENTS United States Patent Office 3,089,099
Patented May 7, 1963

3,089,099

GATED I.F. AMPLIFIER BEAM TYPE

John F. Beckerich and Julius L. Smith, Jr., Richardson, Tex., assignors to Collins Radio Company, Cedar Rapids, Iowa, a corporation of Iowa Filed July 15, 1960, Ser. No. 43,210
4 Claims. (Cl. 330—46)

This invention relates generally to gate controlled amplifiers and more particularly to a gate controlled amplifier which exhibits no "pedestalling" effect in the output as a result of gating action.

Ofttimes in radio and radar applications it is desirable or necessary to include an amplifier circuit which may be selectively controlled so as to translate and amplify an input signal in some time-controlled manner. A control amplifier of this sort might find usage, for example, in the receiver portion of a radar wherein it may be wished to control the receiver with a gate which may be moved in time with respect to the transmitter pulse so that a desired portion of a given range may be investigated. The inclusion in the receiver portion of a gated I.F. amplifier enables the selection of a given segment of the operating range. A specific application in the case of a weather radar would enable the radar to "search" a cross section through a storm and to be able to plot storm intensity as a function of range.

Arrangements for gating an amplifier circuit whereby the amplifier is enabled only in the presence of a gate, are generally undesirable in that the D.C. level of the output signal is modified to various extents as a function of the gating operation. Gating arrangements for amplifiers have been used in noise blanking circuitry for example, and in each case it becomes an extreme problem to prevent such a "pedestalling" effect as a function of the gate application. Known approaches in the art includes the incorporation of a balanced bridge in a push-pull arrangement whereby the pedestal normally caused by the gating pulse may be balanced out in the output. These approaches, however, require an extremely critical balance adjustment with specially designed transformers.

In applications of gated amplifiers such as in a weather radar receiver, exacting control of the D.C. level in the output is essential. The presence of a "thump" due to gating action would prevent plotting precipitation intensity for example, as a function of D.C. level due to the variation in the output D.C. level as a function of the unwanted gating pedestal. This becomes especially important in applications wherein the D.C. level to be recorded may go completely to zero.

It is an object therefor of the present invention to provide a gater I.F. amplifier of simple construction which provides a pedestal-free output.

A further object of the present invention is the provision of a gated I.F. amplifier in which no critical shape restrictions are placed on the switching gate voltages. The present invention is featured in the provision of gating means wherein only the signal components of the output are subject to interruption and in which the D.C. component flows continuously in the load circuit.

The present invention is embodied in the incorporation of a dual plate, beam deflection tube in conjunction with deflection plate biasing arrangements whereby the beam may be selectively switched between the plates. High impedance isolation elements and signal component bypass means are so associated with the plate circuits of the amplifier that one plate of the tube exhibits a low impedance path to ground for signal components appearing thereon while the other plate is highly isolated from ground and is connected to the load.

These and other objects and features of the present invention will become apparent upon reading the following description in conjunction with the accompanying drawing in which the single FIGURE is a schematic diagram of an embodiment of the invention.

The invention, as illustrated schematically in the figure, is seen to comprise a dual plate, beam deflection tube 16 which includes first and second anodes 20 and 21, first and second beam deflection plates 19 and 22, a cathode 44, and grid electrodes 17, 18 and 23. The beam deflection tube illustrated might be a type 6AR8 which includes a moderate transconductance pentode section. A high impedance isolation element 25 is connected between plates 20 and 21. An output load generally designated as a transformer 29 is connected to plate 20. The load might comprise a variable capacitance 27 shunting a primary winding 30 so that it may be tuned and an output terminal 32 is connected to the secondary winding 31 of transformer 39. A source of direct current supply voltage 28 is connected through primary winding 30 of transformer 29 directly to plate 20 of tube 16 and through the element 25 to plate 21. A capacitor 26 is connected between plate 21 and ground with the capacitance being chosen to provide a low impedance path to ground for signal components of the plate current.

Input signal is applied to a terminal 10 and through an input transformer 11 to the control grid 17 of tube 16. The secondary winding 13 of transformer 11 may be shunted by a variable capacitance 14 to provide a means for tuning the input circuit to the incoming signal. Suppressor grid 18 of tube 16 is connected conventionally to the cathode 44 and the cathode is returned to ground through the parallel combination of resistor 33 and capacitor 34 to provide a means for self-biasing tube 16. Deflection plates 19 and 22 of tube 16 are seen to be connected to gate signals 36 and 35 respectively, the gate signals being in the form of direct current pulses of opposite polarity. Deflection plates 19 and 22 are shown connected through resistors 39 and 40 and a switch 45 to sources of D.C. bias 37 and 38 respectively and the sources 37 and 38 are seen to be of opposite polarity. Switch 45 is adapted to reverse the connections of the bias sources to the beam deflecting plates.

Stray capacity coupling across tube 16 is minimized by the incorporation of a variable neutralizing capacitor 15 connected between plate 20 of the tube 16 and the secondary winding 13 of input transformer 11. The screen grid 23 of tube 16 is shown connected to a source of positive direct-current voltage 24.

In operation, the electron beam generated within tube 16 is selectively controlled so as to be directed to one of the plates 20 and 21. In the absence of the gating signals 35 and 36 to the deflection plates 22 and 19 and with switch 45 in the position illustrated, the negative D.C. bias source 37 is seen to be connected through the movable contact 41 of switch 45 and resistor 39 to deflection plate 19 while the positive bias source 38 is connected through movable contact 42 of switch 45 and resistor 40 to deflection plate 22. With this "push-pull" application of the bias sources 37 and 38 to the deflection plates, the electron beam is deflected to the right-hand plate 21 of tube 16. The incoming signal applied to input terminal 10 is thus amplified within tube 16 and appears on plate 21. Capacitor 26 provides a low impedance path to ground for all signal components of the plate current while the isolation element 25 presents an extremely high impedance to these components and thus, the signal components are prevented from reaching the output terminal 32. It is to be noted, however, that the D.C. component of the signal appearing on plate 21 finds an extremely low impedance path to the output terminal through the isolation element 25.

Now considering the presence of the oppositely polarized gate signals 35 and 36, it is seen that during the application thereof the gate signals add differentially to the D.C. bias signals 38 and 37 and effect a net bias on each of the deflection plates 19 and 22 which is opposite in polarity to that impressed in the absence of the gating signals 35 and 36. As illustrated in the figure, the amplitudes of the gate signals 35 and 36 are seen to be twice that of the bias signals 37 and 38 and as concerns each deflection plate 19 or 22, the net bias is of a polarity determined by the gate signals. In effect then, the deflection plates 19 and 22 are oppositely biased during the presence of the gates 35 and 36 and the current in tube 16 is deflected to the left-hand plate 20. Since plate 20 is connected directly to the load and is highly isolated from plate 21 due to the inclusion of impedance element 25, both the signal components and the D.C. component of the plate current are presented to the output. It is seen that this gating action produces no discontinuity in the cathode current of tube 16 when the plate current is switched from plate 21 to plate 20 and thus pedestalling in the output is eliminated without the necessity of critical balancing circuits. Only the signal components of the input signal are discontinued as concerns the output circuit while the D.C. component is continuously applied thereto.

The above described gating operation is realized with switch 45 in the position illustrated. The opposite position of switch 45 provides means whereby the gating action is rendered ineffective and the beam current in tube 16 is continually directed to plate 20, with or without the presence of gates 35 and 36. In this position the bias voltages 37 and 38 are so applied to deflection plates 19 and 22 that the beam is directed to plate 20 and signal components are applied to the load. The presence of gates 35 and 36 does not alter the beam deflection as before since the gate polarities are the same as the bias source polarity as concerns each of the deflection plates 19 and 22.

A circuit constructed in accordance with the present invention and utilizing a type 6AR8 tube with 30-volt biasing sources and 60-volt gates resulted in 40 db of "gate-off" attenuation. Two such gates in series furnished on-off ratios in the order of 80 db. The bandwidth of the gating unit constructed passed a 5 mc. bandwidth without alteration and exhibited a net gain of near unity.

Although this invention has been described with respect to a particular embodiment thereof, it is not to be so limited as changes might be made therein which are within the intended scope as defined in the appended claims.

We claim:

1. A gate controlled signal translating device for selectively translating signal components of an input thereto without discontinuing the direct-current output component thereof comprising a beam amplifier electron discharge device including at least an input electrode, a cathode, first and second anodes and first and second beam deflecting electrodes; a common ground return junction, means for impressing said input signal between said input electrode and said common junction, said cathode being returned to said common junction, an output terminal connected to first said anode, first impedance means connected directly between said first and second anodes, said first impedance means being adapted to present low impedance to direct-current signal components and to substantially block alternating-current components of anode current, second impedance means connected directly between said second anode and said common junction and being adapted to block direct-current signal components and to provide a substantially unimpeded path to alternating-current components of anode current, biasing voltages connected to each of said beam deflecting electrodes and being preselected in polarity and magnitude to effect deflection of said beam to said second anode, a source of direct-current gate signals applied to said beam deflecting electrodes and being preselected in polarity and magnitude to effect deflection of said beam to said first anode during the application thereof.

2. A gate controlled signal translating device for selectively translating signal components of an input thereto without discontinuing the direct-current output component thereof comprising a beam amplifier electron discharge device including at least an input electrode, a cathode, first and second anodes and first and second beam deflecting electrodes; a common ground return junction, means for impressing said input signal between said input electrode and said common junction, said cathode being returned to said common junction, an output terminal connected to first said anode, first impedance means connected directly between said first and second anodes, said first impedance means being adapted to present low impedance to direct-current signal components and to substantially block alternating-current components of anode current, second impedance means connected directly between said second anode and said common junction and being adapted to block direct-current signal components and to provide a substantially unimpeded path to alternating-current components of anode current, a source of oppositely polarized direct-current bias voltages connected respectively to said first and second beam deflecting electrodes, said bias voltages effecting a deflection of said beam to said second anode, a pair of phase-inverted direct-current gate voltages connected respectively to said first and second beam deflecting electrodes, said gate voltages being applied in respective opposition to each of said direct-current bias voltages and being of sufficient magnitude to effect a deflection of said beam to said first anode.

3. A signal translating device as defined in claim 2 further comprising switching means between said sources of direct-current bias and said beam deflecting electrodes, said switching means being adapted to effect by first and second positions thereof the selective application of said direct-current bias signals to said beam deflecting electrodes to respectively oppose and aid said gate signals, whereby said first position of said switching means enables deflection of said beam to said first anode in the presence of said gate signals and the second position thereof effects a deflection of said beam to said first anode with and without the application of said gate signals.

4. A gain controlled amplifying circuit comprising an electron discharge device including at least a cathode, means for generating an electron beam, first and second anodes, first and second beam deflecting electrodes, and an input electrode; an output terminal connected to said first anode, means for applying said input signal between said input electrode and said cathode, said cathode being returned to a common junction, a high impedance isolation element connected directly between said first and second anodes, said isolation element substantially blocking the flow of alternating current components of said input signal, a signal frequency bypass capacitor, said second anode connected directly through said capacitor to said common junction, a pair of direct-current gating signals with opposite polarity applied respectively to said first and second beam deflecting electrodes, means for biasing said beam electrodes comprising first and second oppositely polarized direct-current voltages, said biasing voltages being polarized to effect a deflection of said electron beam to said second anode, said gating signals having a magnitude substantially double that of said biasing sources and respectively applied to said beam deflecting electrodes with polarities opposite those of the associated biasing voltages whereby the signal components of the anode currents are selectively applied to said output terminal only in the presence of said gate signals and the direct-current component of said anode current is continuously applied to said output terminal.

References Cited in the file of this patent

UNITED STATES PATENTS 2,758,153 Adler ---------------- Aug. 7, 1956